US012488829B2

(12) United States Patent
Calandra et al.

(10) Patent No.: US 12,488,829 B2
(45) Date of Patent: Dec. 2, 2025

(54) METHOD AND CIRCUIT FOR POWER-UP OF AN ELECTRONIC CIRCUIT

(71) Applicant: STMicroelectronics (Rousset) SAS, Rousset (FR)

(72) Inventors: Antonio Calandra, Saint Maximin la Sainte Baume (FR); Julia Castellan, Trets (FR); Philippe Bienvenu, Saint-Maximin (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 267 days.

(21) Appl. No.: 18/466,283

(22) Filed: Sep. 13, 2023

(65) Prior Publication Data
US 2024/0119992 A1    Apr. 11, 2024

(30) Foreign Application Priority Data
Oct. 7, 2022    (FR) ........................................ 2210275

(51) Int. Cl.
*G11C 11/4074*    (2006.01)
*G11C 11/4072*    (2006.01)
*G11C 11/4096*    (2006.01)

(52) U.S. Cl.
CPC ...... *G11C 11/4074* (2013.01); *G11C 11/4072* (2013.01); *G11C 11/4096* (2013.01)

(58) Field of Classification Search
CPC ............ G11C 11/4074; G11C 11/4072; G11C 11/4096; H02M 1/32; H02M 1/36; H03K 17/0822; H03K 17/08104; H02H 9/001
USPC ....................................................... 365/226
See application file for complete search history.

(56) References Cited

U.S. PATENT DOCUMENTS

| | | | |
|---|---|---|---|
| 7,064,946 | B2 | 6/2006 | Thiery et al. |
| 8,299,767 | B1 | 10/2012 | Tuozzolo et al. |
| 9,306,559 | B2 | 4/2016 | Barnette et al. |
| 9,712,061 | B1 * | 7/2017 | Newlin ............... H02M 3/1588 |
| 2015/0357811 | A1 | 12/2015 | Barnette et al. |
| 2019/0181862 | A1 | 6/2019 | Flipo et al. |
| 2019/0250657 | A1 * | 8/2019 | Kudva ..................... G05F 1/462 |
| 2022/0060109 | A1 * | 2/2022 | Wollschlager ........ H02M 3/156 |
| 2022/0103069 | A1 * | 3/2022 | Chiang ................... H02M 1/32 |
| 2024/0111321 | A1 * | 4/2024 | Fueki ....................... G05F 3/262 |

OTHER PUBLICATIONS

Shue, John L., et al., "Power MOSFET Thermal Instability Operation Characterization Support", NASA TM-2010-216684, Maryland, US, Apr. 2010, 23 pages.

* cited by examiner

*Primary Examiner* — Fernando Hidalgo
(74) *Attorney, Agent, or Firm* — Slater Matsil LLP

(57) ABSTRACT

The present disclosure relates to a method comprising: applying, by a control circuit, a first pulsed signal, consisting of sequential first voltage pulses, to the gate of a power transistor supplying a capacitive load of the circuit, the pulses of the first pulsed signal being separated from each other by a first wait time; further to one or more of the pulses of the first signal, making a comparison, by a comparator, of the value of the voltage across the capacitive load with a first voltage threshold value; and, if the first voltage threshold value is exceeded, applying a second pulsed signal, consisting of sequential second voltage pulses, to the gate of the power transistor, the pulses of the second pulsed signal being separated from each other by a second wait time shorter than the first wait time.

20 Claims, 5 Drawing Sheets

METHOD AND CIRCUIT FOR POWER-UP OF AN ELECTRONIC CIRCUIT

CROSS-REFERENCE TO RELATED APPLICATIONS

This application claims the priority benefit of French Patent Application No. 2210275, filed on Oct. 7, 2022, entitled "Procédé et circuit de mise sous tension d'un circuit électronique," which is hereby incorporated herein by reference to the maximum extent allowable by law.

TECHNICAL FIELD

The present disclosure generally relates to a method and a circuit for power-up of an electronic circuit comprising a high capacitive load.

BACKGROUND

In some fields, such as for example the automotive field, electronic circuits comprise high capacitive loads to be charged upon the power-up of the circuits. Supplying the capacitive load is for example performed from a battery, and via a power transistor. As an example, capacitive loads comprise devices to be supplied that may be associated with capacitances, and also comprise capacitive conductors coupling the power transistor to the devices to be supplied. It is desirable that charging capacitive loads of the circuit is relatively fast so that the devices are functional in a relatively short time.

On one hand, applying a high density of current across the power transistor during the supply of an electronic circuit allows a fast charging of the capacitive loads. However, a high density of current may be seen by the circuit as being due to a short-circuit, and thus initiate protective mechanisms. Additionally, applying a high density of current stresses some components, among which is the power transistor.

On the other hand, applying a too low density of current may set the power transistor in a thermal instability area and deteriorate it.

There is a technical issue in effectively charging the capacitive loads having high capacitances upon the power-up of an electronic circuit, without setting the power transistor supplying the capacitive loads in a thermal instability state, and while monitoring the chance of short-circuit, and avoiding applying a too high density of current susceptible to deteriorate other components of the circuit.

SUMMARY

There is a need to improve the methods and circuits for charging the capacitive loads of an electronic circuit upon its power-up.

One embodiment addresses all or some of the drawbacks of known charging methods.

An embodiment provides a method for electrical power-up of a circuit, the method comprising:
the application, by a control circuit, of a first pulsed signal, consisting of sequential first voltage pulses, to the gate of a power transistor, the power transistor supplying a capacitive load of the circuit, the pulses of the first pulsed signal being separated from each other by a first wait time;
after one or more pulses of the first signal, a comparison, by a comparator, of the voltage value across the capacitive load with a first voltage threshold value; and
if the first voltage threshold value is exceeded, the application, by the control circuit, of a second pulsed signal, consisting of sequential second voltage pulses, to the gate of the power transistor supplying the capacitive load of the circuit, the pulses of the second pulsed signal being separated from each other by a second wait time shorter than the first wait time.

According to an embodiment, the preceding method further comprises:
after one or more pulses of the second signal, a second comparison, by the comparator, of the voltage value across the capacitive load with the first voltage threshold value;
if during the second comparison, the value of the voltage is smaller than or equal to the first voltage threshold value, the stopping, by the control circuit (206), of the second pulsed signal.

According to an embodiment, the preceding method further comprises:
after one or more pulses of the second signal, a comparison, by the comparator, of the voltage value across the capacitive load with a second voltage threshold value;
if the value of the voltage is equal to or greater than the second voltage threshold value, the stopping, by the control circuit, of the second pulsed signal.

According to an embodiment, the preceding method further comprises:
after one or more pulses of the first pulsed signal and if the voltage value across the capacitive load is smaller than the first voltage threshold value, the incrementation, using a counter of the circuit, of a first count value; and
if the count value is equal to a first reference value, the stopping, by the control circuit, of the first pulsed signal.

According to an embodiment, the preceding method further comprises:
after one or more pulses of the second pulsed signal, the incrementation, using a counter of the circuit, of a second count value; and
if the second count value is equal to a second reference value, the stopping, by the control circuit, of the second pulsed signal.

According to an embodiment, the control circuit applies each pulse of the first pulsed signal to the power transistor, by performing:
the application of a first edge causing the power transistor ON;
the verification, by a detection circuit, of a first current level conducted by the power transistor, and
when the first current level reaches a threshold level, the application of a second edge causing the power transistor OFF.

According to an embodiment, the control circuit applies each pulse of the second pulsed signal to the power transistor, by performing:
the application of a third edge causing the power transistor ON;
the verification, by the detection circuit, of a second current level conducted by the power transistor, and
when the second current level reaches the threshold level, the application of a fourth edge causing the power transistor OFF.

According to an embodiment, the threshold level corresponds to a current level at which the thermal coefficient of the power transistor is negative.

According to an embodiment, the control circuit applies each pulse of the first pulsed signal to the power transistor, by performing:

the application of a first edge causing the power transistor ON;

the comparison, by a temperature sensor of the circuit, of the temperature of the power transistor, and when the temperature of the transistor reaches a threshold temperature, the application of a second edge causing the power transistor OFF.

According to an embodiment, at least one value among: the first voltage threshold value; the value of the first wait time; and the value of the second wait time are determined by a value stored in a programmable memory of the circuit.

An embodiment provides a circuit comprising:

a power transistor configured to supply a capacitive load of the circuit;

a control circuit configured to apply a first pulsed signal consisting of sequential first voltage pulses separated from each other by a first wait time, to the gate of a power transistor; and a comparator configured to compare, further to one or more pulses of the first signal, the voltage value across the capacitive load with a first voltage threshold value, the control circuit being further configured to, if the first voltage threshold value is exceeded, apply a second pulsed signal, consisting of sequential second voltage pulses separated from each other by a second wait time, to the gate of the power transistor supplying the capacitive load of the circuit, the second wait time being shorter than the first wait time.

According to an embodiment, the comparator is further configured to, further to one or more pulses of the second signal, perform a second comparison of the voltage value across the capacitive load with the first voltage threshold value, and wherein the control circuit is further configured to, if during the second comparison the value of the voltage is smaller than or equal to the first voltage threshold value, stop the first pulsed signal.

An embodiment provides a system comprising:

a transformer configured to supply a switch box;

the switch box comprising the preceding circuit.

According to an embodiment, the transformer and the switch box are parts of an automotive vehicle.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF ILLUSTRATIVE EMBODIMENTS

Like features have been designated by like references in the various figures. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail. In particular, the operation of the power transistors has not been detailed and is well known by those skilled in the art.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figure 1:
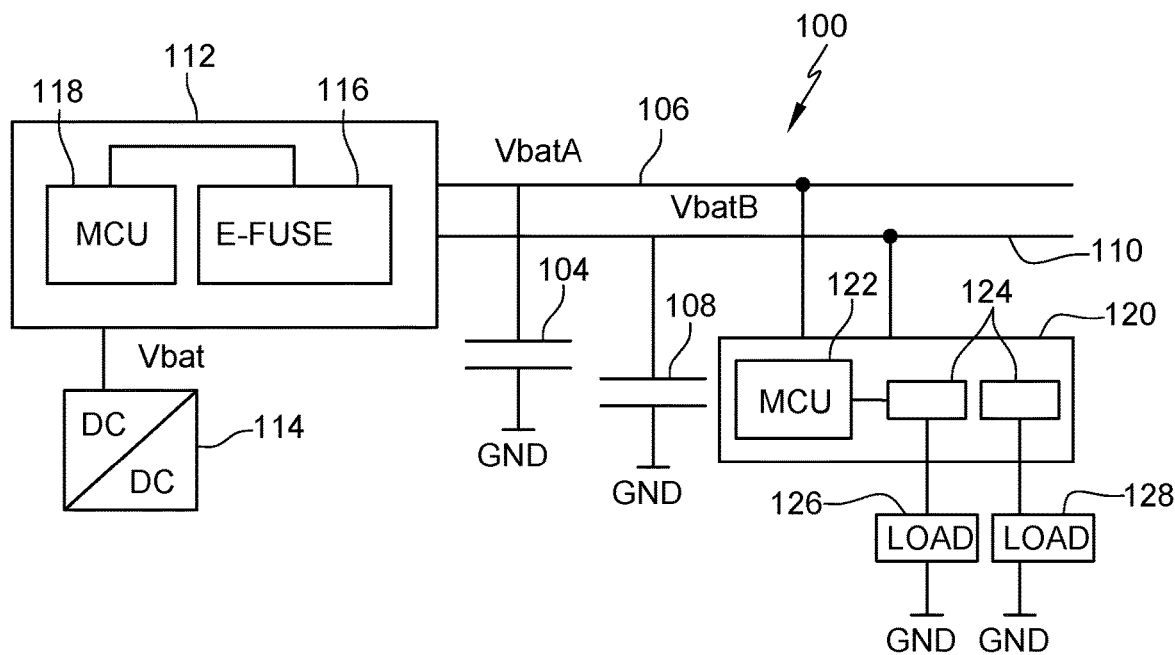
FIG. 1 is a block diagram representing a system configured to supply capacitive loads of an electronic circuit according to an embodiment of the present disclosure.

FIG. 1 is a block diagram illustrating a system 100 configured to supply capacitive loads 104 and 108 of an electronic circuit according to an embodiment of the present disclosure. The system 100 constitutes a part of a larger device (not represented), such as for example the electronic system of a motor vehicle, having a high capacitive load.

As an example, the capacitive load 104, illustrated by a capacitor coupled to ground (GND), is supplied by a first rail 106, and the capacitive load 108, being represented by a further capacitor coupled to ground (GND), is supplied by a second rail 110. Although only two capacitive loads 104 and 108, and two rails 106 and 110 are represented in FIG. 1, it is certainly possible that the system 100 comprises a larger number of capacitive loads, each supplied by a corresponding rail.

The system 100 further comprises a switch box 11, as well as a transformer 114 (DC/DC) configured to supply the switch box 112 by applying to it a voltage Vbat. For example, the transformer 114 receives an input DC voltage from a DC source (not represented in FIG. 1), such as a battery, and generates the voltage Vbat having a voltage level different from the input DC voltage. According to other embodiments, the transformer 114 is omitted, and the switch box 112 is supplied directly by the battery.

The switch box 112 comprises for example an electronic circuit 116 (E-FUSE) configured to, for example, supply the rails 106 and 110 via one or more power transistors.

The switch box 112 further comprises for example a processing unit 118 (MCU) configured to drive the electronic circuit 116, for example in order to manage the supply of different components supplied by circuit 116.

System 100 further comprises for example a circuit 120 coupled with the switch box 112 via the rails 106 and 110. Circuit 120 for example comprises a processing unit 122 (MCU) as well as electronic circuits 124. As an example, the circuit 120 is a device comprising one or more other electronic circuits. Circuit 120 for example supplies other loads 126 and 128 (LOAD) coupled to the ground (GND).

Upon the power-up of the system 100, that is when the transformer 114 powers-up the switch box 112, the circuit 116 is then controlled to supply the rails 106 and 110 by applying them a voltage VbatA and VbatB, respectively. First, the capacitive loads 104 and 108 are charged so that all the circuits supplied by the rails 106, 110 are operational, including circuit 120. It is thus desirable that the capacitive loads 104 and 108 are quickly charged.

In some applications, for example as the system 100 is embedded in a motor vehicle, the whole capacitive load of the system 100 has a high capacitance, for example a capacitance higher than 1 mF (milli-Farad). Applying a high density of current at the output of the switch box 112 on the rails 106 and 110 allows the capacitive loads 104 and 108 to be quickly charged, but can stress, and/or deteriorate some components, such as power transistors and/or printed circuits. Additionally, applying a high current may be considered by the device as being due to a short circuit, and thus initiate protection mechanisms.

However, when a too low current density is applied via a power transistor included for example in the switch box 112, it may deteriorate the power transistor by setting it in a thermal instability state generating a thermal runaway.

Figure 2:
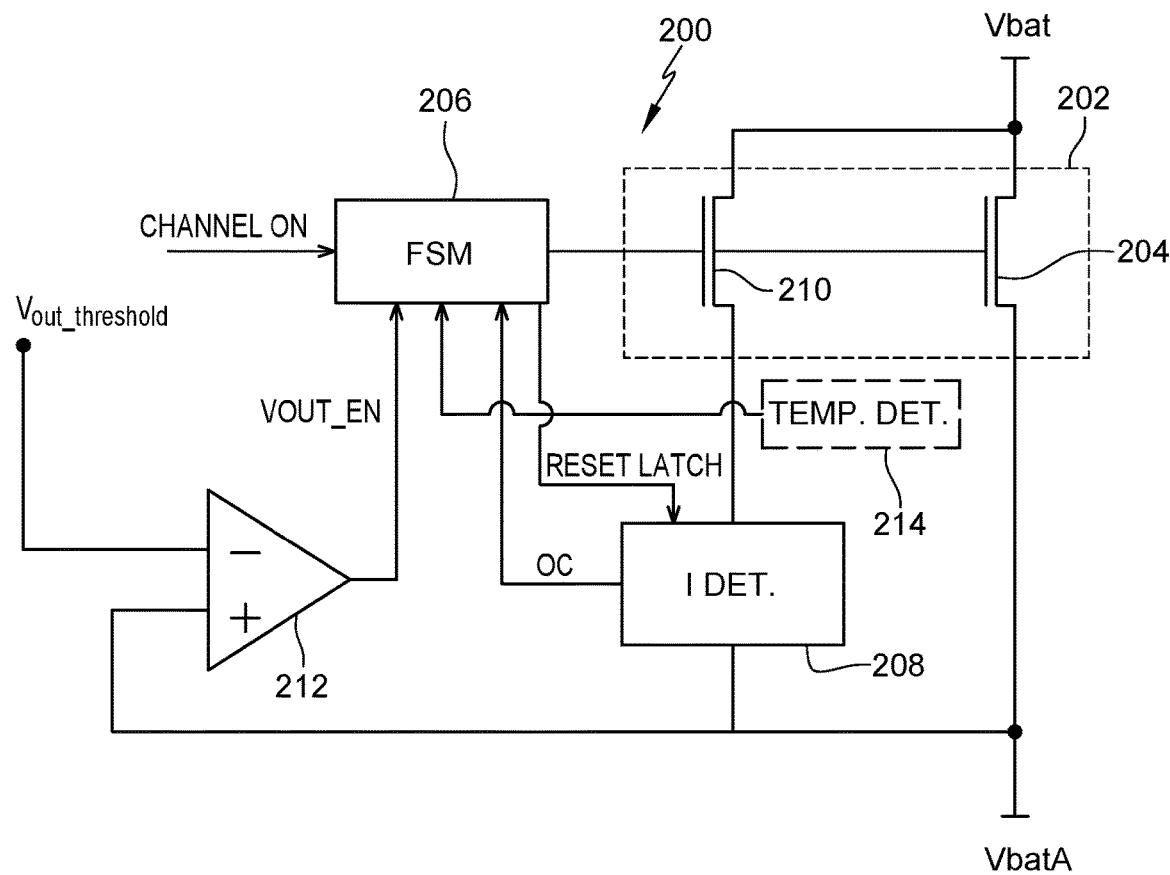
FIG. 2 illustrates an example of a circuit implementing a switch box of FIG. 1 according to an embodiment of the present disclosure.

FIG. 2 illustrates a circuit 200 included in the circuit 116 of the switch box 112 of FIG. 1 according to an embodiment of the present disclosure. The circuit 200 of FIG. 2 is configured to supply the rail 1o6. A circuit similar to the circuit 200 is for example also present in the switch box 112 to supply the rail 110.

Circuit 200 comprises a power transistor 202 the drain of which is for example coupled with the voltage rail supplied by the transformer 114 applying it the voltage Vbat. The source of power transistor 200 is coupled with the rail 106 and applies it a voltage VbatA. Power transistor 202 for example comprises a plurality of parallel transistors, two of which being represented in FIG. 2 labelled 204 and 210. As an example, the transistors 204 and 210 included in the power transistor 202 are N-channel MOSFET (Metal Oxide Semiconductor Field Effect Transistor) type (NMOS) transistors.

Circuit 200 further comprises a control circuit 206 (FSM) coupled to the gate of the power transistor 202. The control circuit 206 is implemented for example by a finite-state machine. The control circuit 206 for example receives a signal CHANNEL_ON indicating when the rail 106 is to be supplied. For example, the signal CHANNEL_ON is generated by the processing unit 118.

Circuit 200 further comprises a detection circuit 208 (I DET.), for example arranged to couple the drain of the power transistor 210 to the rail 106. An output of the detection circuit 208 is for example coupled with the control circuit 206.

Detection circuit 208 is for example configured to compare the current flowing through the transistor 210 with a threshold current. Transistor 210 has for example a relatively small size as compared to the whole size of the power transistor 202, and thus conducts only a relatively small part of the whole current supplied by the power transistor 202. The level of the current sensed by the detection circuit 208 is however proportional with the whole current conducted by the power transistor 202. As an example, the threshold current corresponds to a density of current in the power transistor 202 for which the power transistor 202 is in a thermal stability state.

Figure 3:
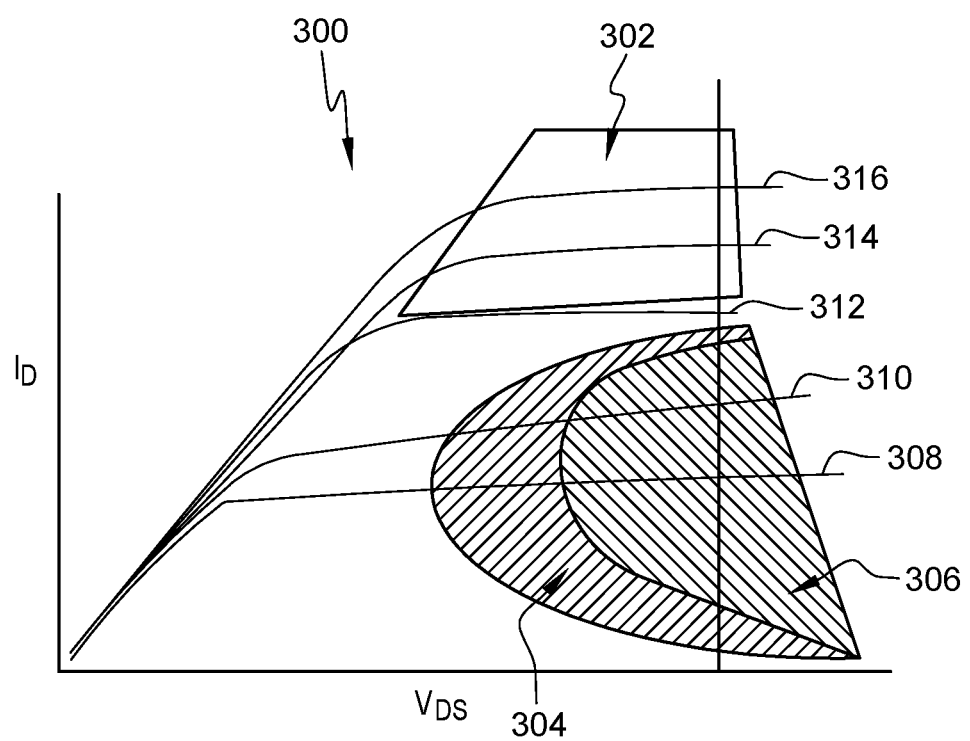
FIG. 3 is a graph illustrating areas of thermal stability and instability of a power transistor.

FIG. 3 is a graph 300 illustrating a thermal stability area 302 and thermal instability areas 304 and 306 of a power transistor, such as the transistor 202 of FIG. 2. The area 304 for example corresponds to a first instability level of the power transistor, while the area 306 for example corresponds to an increased instability level for which the thermal runaway phenomenon occurs. The thermal coefficient of the power transistor 200 is negative for the area 302 and is positive for the areas 304 and 306.

In particular, the graph 300 shows five curves 308 to 316 representing the relationship between the voltage $V_{DS}$ between the drain and the source of the transistor and the current $I_{DS}$ flowing between the drain and the source for several voltage values $V_{GS}$ between the gate and the source of the transistor and at different temperatures.

The curves 308 and 310 represent the relationship $V_{DS}$ and $I_{DS}$ as the voltage $V_{GS}$ is equal to 3 V and at temperatures of 25° C. and 125° C., respectively. The current $I_{DS}$ increases linearly proportional to the voltage $V_{DS}$, then the increasing is quickly slowed when the power transistor is at saturation. The current $I_{DS}$ remains relatively low and the transistor 210 first enters the instability area 304, for example when the voltage $V_{DS}$ is in a first voltage range, then the instability area 306, for example when the voltage $V_{DS}$ exceeds the upper limit of the first voltage range. When the transistor 210 enters the instability area 306, the thermal runaway phenomenon occurs, leading for example to issues in focusing the current and forming of hot spots deteriorating once and for all the power transistor 202.

The curve 312 represents the relationship between the current $I_{DS}$ and the voltage $V_{DS}$ when the voltage $V_{GS}$ is equal to 6 V and at temperatures of 25° C. and 125° C. In this example, the curve 312 extends between the areas 304 and 302.

Curves 314 and 316 represent the relationship $V_{DS}$ and $I_{DS}$ as the voltage $V_{GS}$ is equal to 8 V and at temperatures of 125° C. and 25° C., respectively. Particularly, the bend of the curves 314 and 316, separating the linear growing area between the current $I_{DS}$ and the voltage $V_{DS}$ and the saturation area in which the current $I_{DS}$ increases slower, occurs for a value of the current $I_{DS}$ far higher than the curves 308 and 310. Particularly, for the example represented by the curves 314 and 316, the saturation of the power transistor occurs when the current $I_{DS}$ is large enough to set the power transistor in the thermal stability area.

Back in relation with FIG. 2, according to an embodiment, the control circuit 206 is configured to apply voltage pulsed signals to the gate of the power transistor 202. Each receiving of a voltage pulse sets the transistors 204 and 210 at the ON state, allowing thus the capacitive load 104 to be charged, with a high density of current during at least a part of the pulse. When the current flowing through the transistor 210 reaches the threshold value, the detection circuit 208 is configured to activate an overcurrent signal OC towards the control circuit 206, and the control circuit 206 is configured to control, responsive to the signal OC, the triggering of the transistors 204 and 210 to the OFF state. The control circuit 206 is further configured to back trigger the transistors 204 and 210 to the ON state after a wait time, thus allowing a new pulse of the pulsed signal. The wait time allows the power transistor 202, for example, to cool enough so as not to overheat.

According to an embodiment, the circuit 200 comprises a comparator 212 configured to compare the voltage VbatA on the rail 106 with a voltage threshold value $V_{out\_th}$. The comparator 212 is further configured to transmit a signal VOUT_EN to the control circuit 206 when the voltage value VbatA reaches the voltage threshold value $V_{out\_th}$. The comparison is for example performed in a continuous manner. In another example, the comparator 212 is configured to compare the values of the voltages VbatA and $V_{out\_th}$ in a periodic manner, for example further to a given number of sequential pulses.

Figure 4:
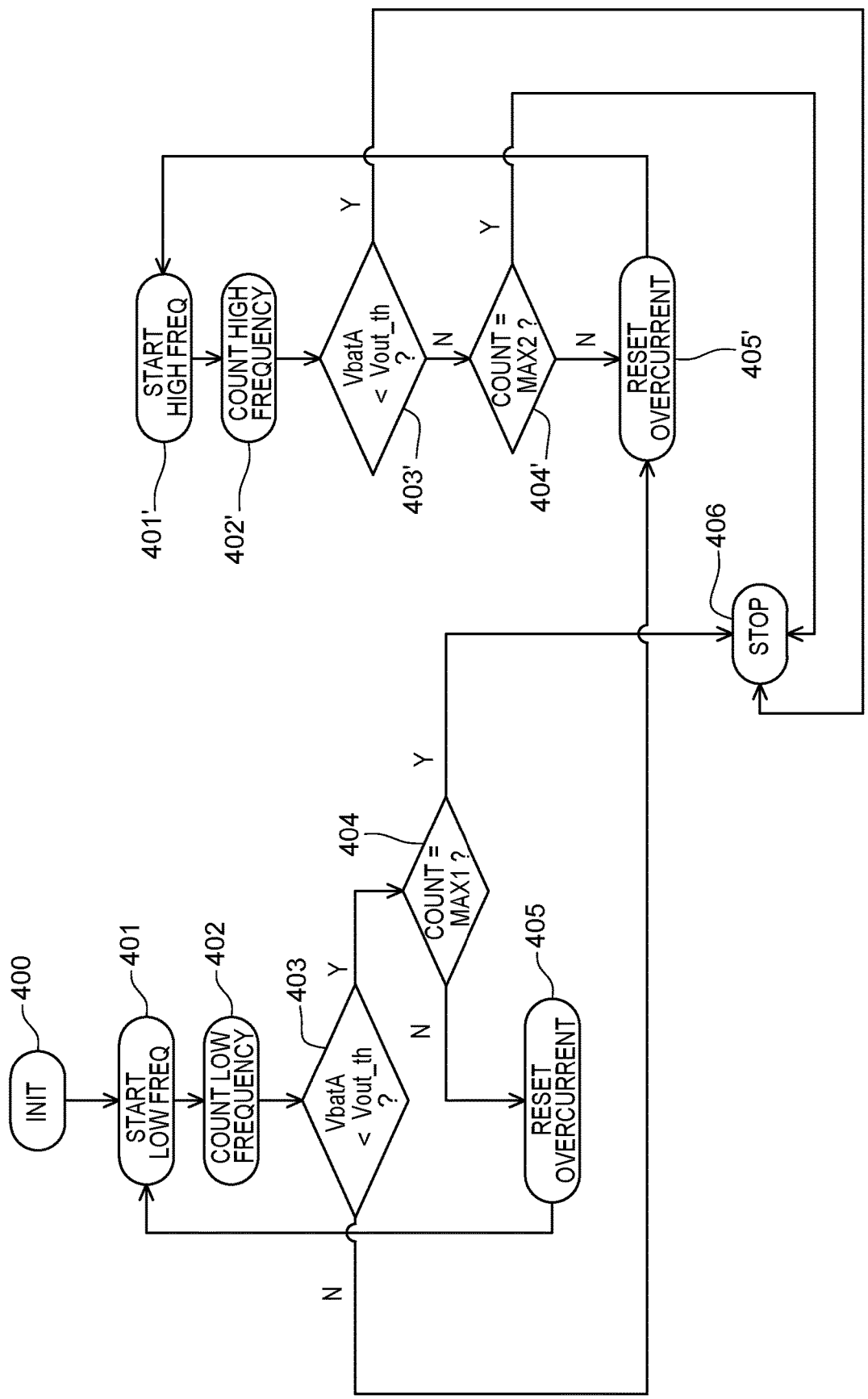
FIG. 4 is a flow diagram illustrating steps of a method for power-up of an electronic circuit comprising a capacitive load according to an embodiment of the present disclosure.

FIG. 4 is a flow diagram illustrating steps of a method for power-up the electronic circuit 200 supplying the rail 106, according to an embodiment of the present disclosure.

Figure 5A:
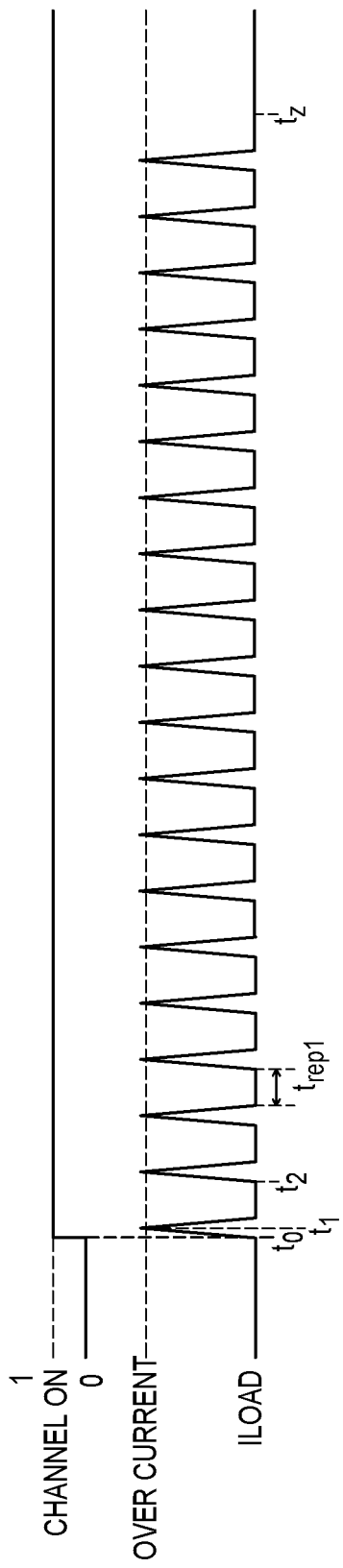
FIG. 5A is a time chart illustrating a current conducted by the power transistor according to an embodiment of the present disclosure.
Figure 6A:
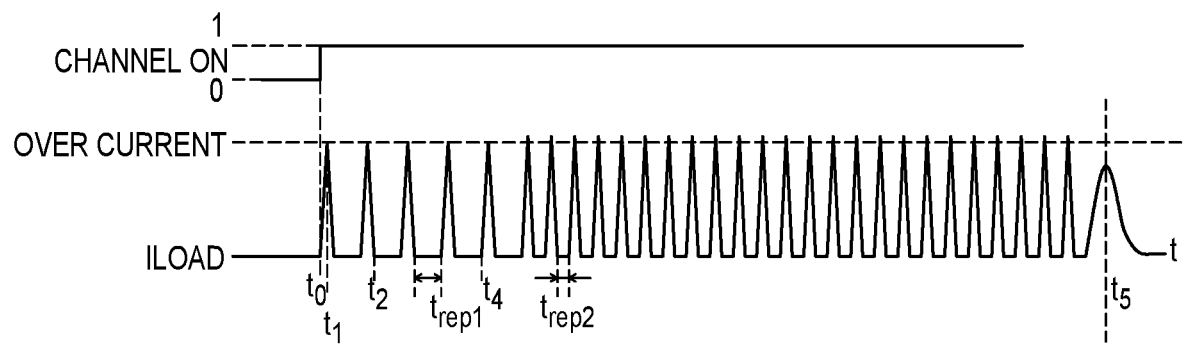
FIG. 6A is a time chart illustrating a current conducted by the power transistor according to another embodiment of the present disclosure.

FIGS. 5A and 6A are time charts illustrating the current density conducted by the power transistor 202 according to an embodiment of the present disclosure.

Figure 5B:
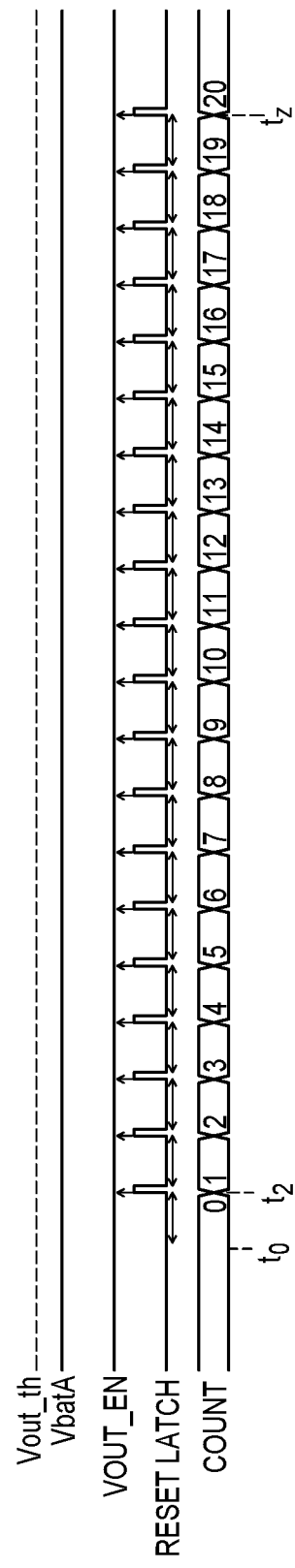
FIG. 5B is a time chart illustrating the evolution of the voltage across the capacitive load according to an embodiment of the present disclosure.
Figure 6B:
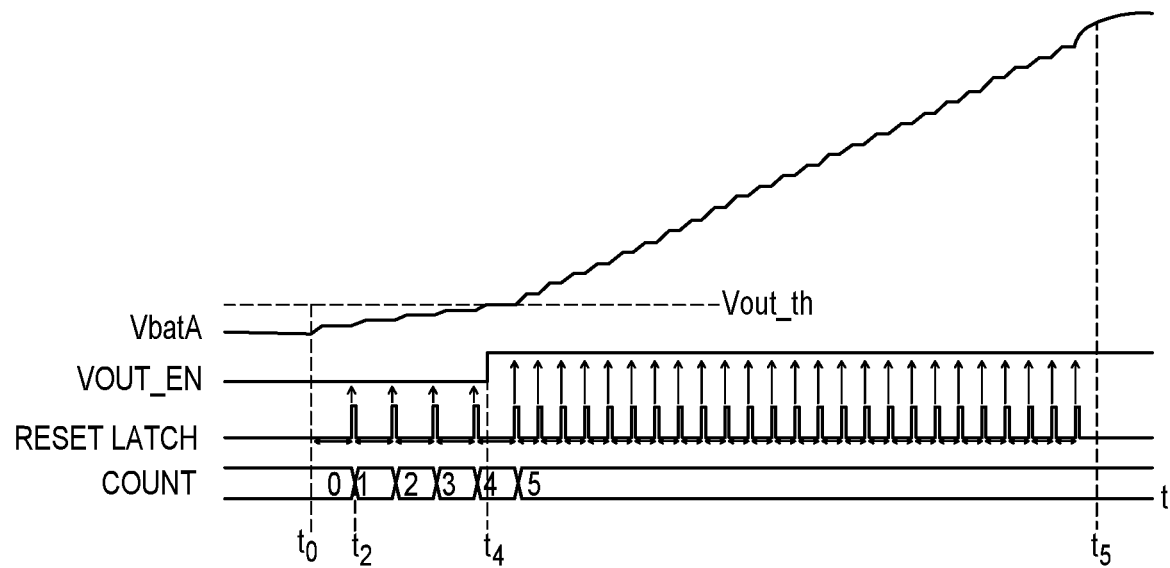
FIG. 6B is a time chart illustrating the evolution of the voltage across the capacitive load according to an embodiment of the present disclosure.

FIGS. 5B and 6B are time charts illustrating the evolution of the voltage VbatA according to an embodiment of the present disclosure.

At a step 400 (INIT) in FIG. 4, the circuit 200 is not supplied by the transformer 112. The power transistor 202 is consequently not supplied, and does not supply the rail 106.

According to an embodiment, the switch box 112 comprises a counter (not represented in FIG. 2) configured to increment a count value COUNT being for example initialized to the value 0 when the circuit 200 is not supplied.

According to an embodiment, the method for power-up of the circuit 116 decomposes into two phases. A first phase, consisted for example of a sequence of steps 401-405, corresponding to a supply of the rail 106 by a pulsed signal at relatively low frequency. In the case no anomaly was detected, the first phase is followed by a second phase consisted for example of a sequence of steps 401'-405', corresponding to a supply of the rail 106 by a pulsed signal at relatively high frequency, that is a pulse frequency higher than the pulsed signal at relatively low frequency.

As represented in FIGS. 5A and 6A, the power-up of the circuit 200 causes for example the receiving, at a time to, of the signal CHANNEL_ON, for example transmitted from the processing unit 118 to the control circuit 206.

At step 401 (START LOW FREQ) of FIG. 4, starting from time $t_0$ upon receipt of the signal CHANNEL_ON, the control circuit 206 sends a voltage edge to the power transistor 202 in order to set it in the ON state. In the case where the power transistor 202 is implemented by a P-channel transistor, this voltage edge is for example a falling edge. In other case where the power transistor is implemented by a N-channel transistor, this voltage edge is for example a rising edge. The power transistor 202 remains at the ON state until the detection circuit 208 sends the signal OC to the control circuit 206, indicating that the current ILOAD flowing through the power transistor 202 reaches a threshold value OVER_CURRENT. As an example, the threshold value is stored in a programmable array of the circuit 200 coupled to the detection circuit 208. In the examples represented in FIGS. 5A, B, 6A, and 6B, the generation of the signal OC for example occurs at a time $t_1$. Upon receipt of the signal OC, the control circuit 206 is further configured to apply another voltage edge to the power transistor 202 in order to set it at the OFF state. In the case where the power transistor is implemented by a P-channel transistor, this voltage edge is for example a rising edge. Further to the triggering of the power transistor 202 to the OFF state, the current ILOAD decreases in a continuous manner until falling null.

Further to the receipt of the signal OC and in a step 402 (COUNT LOW FREQUENCY), a timer, or a time-unit counter, of the circuit 200 (not represented in FIG. 2) is started.

As an example, the timer is for example configured to time a first period of time. As an example, the first period of time is around 4 ms. The timer is further configured to report to the control circuit 206 that the first period of time elapsed from the receiving of the signal OC, in such case. In some cases, the first period of time is programmable. For example, a value representing the first period of time is stored in the programmable memory, and the timer is configured to read this value in the programmable memory and to report to the control circuit 206 when this period of time elapsed. The first period of time for example sets a wait time $t_{rep1}$ between the pulses during the first phase.

Once the first period of time elapsed, the control circuit 206 checks, in a step 403 (VbatA<$V_{out\_th}$?), on the basis of the output signal of the comparator 212, if the voltage value VbatA is lower than the voltage threshold value $V_{out\_th}$. As an example, the voltage threshold value $V_{out\_th}$ is stored in the programmable memory and is converted by a digital analog converter into the analog voltage $V_{out\_th}$. The step 403 further comprises incrementing the count value COUNT.

If the voltage value VbatA is lower than the threshold value $V_{out\_th}$ (branch Y), the method goes on with a step 404 (COUNT1=MAX1?) wherein the count value COUNT is compared, for example by the processing unit 118, with a first maximum value. If the count value COUNT is not equal to the first maximum value (branch N), the method goes on in a step 405 (RESET OVERCURRENT). As an example, the first maximum value is stored in the programmable array.

In the example represented in the FIGS. 5A, 5B, 6A, and 6B, the step 405 occurs at a time $t_2$.

At step 405 (RESET OVERCURRENT), the control circuit 206 generates a signal RESET LATCH controlling the reset of the detection circuit 208, and thus the reset of the overcurrent signal OC. In a first example, the signal RESET LATCH causes the reset of the overcurrent signal OC, and the signal RESET LATCH remains active during a relatively short period of time before being turned off, this period of time being selected to be shorter than the rising time of the current peaks. As an example, the signal REST LATCH remains active during a period, for example shorter than 20 us and preferably shorter than 10 us. In another example, the signal RESET LATCH is a signal having no priority over the detection of the overcurrent by the detection circuit 208. In such a case, if the detection circuit 208 detects an overcurrent while the signal RESET LATCH is active, the detection circuit 208 however activates the overcurrent signal OC. The method then returns to step 401.

In the example represented in FIGS. 5A and 5B, the method goes on so forth, in a sequence of execution of steps 401-405, until an execution of the step 405, at a time $t_3$, in which the count value COUNT reaches the maximum value (branch N at the output of step 404). The maximum value is for example equal to 20. However, any other integer value is conceivable as the maximum value. In such a case, the method ends in a step 406 (STOP).

Indeed, if, further to the application of a number equal to the maximum value of pulses of the first signal, the voltage VbatA has not yet exceeded the voltage threshold value $V_{out\_th}$, this reveals a problem inside the system 100 such as for example a short circuit. The step 406 then consists, for example, in power-off the circuit 116 or the switch box 112.

In the example represented in FIGS. 6A and 6B, the voltage VbatA reaches the voltage threshold value $V_{out\_th}$ (branch N at the output of step 403) at a time $t_4$. In this example, the count value is then equal to 4 and is smaller than the maximum value. Since the voltage VbatA reaches the voltage threshold value relatively quickly, this reveals that the rail 106 is properly supplied and that no short-circuit occurs.

When, at step 403, it is determined that the rail 106 is properly supplied and the power transistor 202 endures the supply and is not short circuited, the wait time between two pulses is reduced, and/or the duty cycle of the pulses is increased, in order to speed the increasing of the voltage on the rail 106 up.

As an example, when the voltage value VbatA reaches the value $V_{out\_th}$, the count value COUNT is reset, for example at 0.

The method then goes on with a step 405' (RESET OVERCURRENT), similar to step 405 and during which the detection circuit 208 is then reset.

The method then goes on with the sequence of steps 401'-404'. The step 401' (START HIGH FREQ) is similar to step 401 and consists in applying, by the control circuit 206, a voltage edge rendering ON the power transistor 202. The control circuit 206 then applies a further voltage edge, rendering OFF the power transistor 202, upon receipt of the signal OC.

Step 402' (COUNT HIGH FREQUENCY) is similar to the step 402 except that the timer is configured to report to the control circuit 206 that a second period of time elapsed since the receipt of the signal OC, in such case. The value of the second period of time is for example stored in the programmable memory. In addition, the value of the second period of time is smaller than the value of the first period of time. The second period of time is for example around 1 ms. The second period of time sets for example a wait time $t_{rep2}$ between the pulses during the second phase, the wait time $t_{rep2}$ being shorter than the wait time $t_{rep1}$. Thus, the wait time of the power transistor 202 between its triggering to the OFF state and the time when it returns to the ON state is faster than during the first supply phase. The charging of the capacitive load 104 is then speed up.

The step 403' is similar to the step 403.

If, during the execution of the step 403', the comparator 212 determines that the voltage VbatA becomes smaller than the voltage threshold value $V_{out\_th}$ (branch Y), the method ends at step 406. Indeed, if the voltage VbatA becomes smaller than the threshold value $V_{out\_th}$, an issue, such as a short circuit, occurs inside the system 100.

The step 404' (COUNT=MAX2 ?) follows the step 403' when the voltage VbatA is still higher than the threshold value $V_{out\_th}$ (branch Y). The step 404' is similar to step 404, except that the count value is compared with a second maximum value. The second maximum value is for example stored in the programmable memory. In another example, the second maximum value is equal to the first maximum value and the steps 404' and 404 are identical.

Like during the first supply phase, if during step 404' the count value is equal to the second maximum value (branch Y), that means that charging again the capacitive load 104 takes too much time and that an anomaly occurs. The method then ends at step 406.

If at step 404', the count value is not equal to the second maximum value (branch N), the method returns to step 401'.

In the example represented in FIGS. 6A, and 6B, the sequence of steps 401'-405' is executed until a time $t_5$, for example occurring during the execution of step 401'. Time $t_5$ corresponds to the time when the capacitive load 104 is fully charged, and the voltage VbatA then remains constant. As an example, the control circuit 206 is further configured to detect the time when the capacitive load 104 is fully charged and to for example let the transistor 202 at the ON state in order to continuously supply the devices such as for example the circuit 120. In another example, the circuit 200 comprises a further comparator configured to compare the voltage VbatA with a maximum voltage Vmax corresponding to the voltage on the rail 106 when the capacitive load 104 is fully charged. As an example, the voltage value Vmax is stored in the programmable memory.

In the example represented in FIGS. 6A and 6B, the rail 106 is supplied by a signal at a first voltage pulse frequency, applied to the control circuit 206. The signal at the first pulse frequency is emitted between the times $t_0$ and $t_4$. The rail 1o6 is then supplied by a new signal, to a second pulse frequency higher than the first frequency, emitted by the control circuit 206 between the times $t_4$ and $t_5$. The wait time $t_{rep1}$ between each pulse of the signal at the first voltage pulse frequency is greater than the wait time $t_{rep2}$ between each pulse of the signal at the second pulse frequency. The wait time between two pulses corresponds, for example, to the period between the end of a pulse and the beginning of the next pulse. In addition, the length of a current pulse changes relatively little during the charging of the capacitive load 104. The voltage pulses of the signal at the first frequency then have, for example, a length similar to the voltage pulses of the signal at the second frequency. Thus, the duty cycle of the signal at the first pulse frequency is, for example, smaller than the duty cycle of the signal at the second pulse frequency.

According to another embodiment, the circuit 200 comprises, in addition to the detection circuit 208, or instead of the detection circuit 208, a temperature sensor configured to compare the temperature of the circuit 200 and, more particularly, the temperature of the power transistor 202, with a threshold temperature. The temperature sensor is for example coupled to the control circuit 206 and further configured to transmit it a signal when the sensed temperature exceeds the threshold temperature. The control circuit 206 is for example configured to turn the supply of the power transistor 202 off upon receiving the signal transmitted by the thermal sensor.

An advantage of the described embodiments is that they allow a fast charging of the capacitive loads of a circuit, while monitoring the chances of short circuit, and avoiding setting the power transistor in a thermal instability state.

Another advantage of the described embodiments is that the wait time between the pulses decreases, and/or the duty cycle of the pulsed signal increases, when the chances of short circuit is eliminated.

Another advantage of the described embodiments is that the supply of the rails by pulsed signals interspersed by wait times allows the power transistor 202 not to overheat and to endure a supply by a high current but in a discontinuous manner.

Various embodiments and variants have been described. Those skilled in the art will understand that certain features of these embodiments can be combined and other variants will readily occur to those skilled in the art. In particular, a counter and a count value may be used during the first supply phase and a further counter, incrementing a further count value, or alternatively, the same counter incrementing the further count value, may be used during the second supply phase.

Finally, the practical implementation of the embodiments and variants described herein is within the capabilities of those skilled in the art based on the functional description provided hereinabove. In particular, the durations indicated for the different wait times of the power transistor are only informative and are not limitative.

What is claimed is:

1. A method for electrical power-up of a circuit, the method comprising:
   applying, by a control circuit, a first pulsed signal, comprising sequential first voltage pulses, to a gate of a power transistor, the power transistor supplying a capacitive load of the circuit, the sequential first voltage pulses of the first pulsed signal being separated from each other by a first wait time;
   after one or more pulses of the first pulsed signal, first comparing, by a comparator, a voltage value across the capacitive load with a first voltage threshold value; and
   in response to the voltage value exceeding the first voltage threshold value, applying, by the control circuit, a second pulsed signal, comprising sequential second voltage pulses, to the gate of the power transistor, the sequential second voltage pulses of the second pulsed signal being separated from each other by a second wait time shorter than the first wait time.

2. The method according to claim 1, further comprising:
   after one or more pulses of the second pulsed signal, second comparing, by the comparator, the voltage value across the capacitive load with the first voltage threshold value; and
   during the second comparing, in response to the voltage value being smaller than or equal to the first voltage threshold value, stopping, by the control circuit, the second pulsed signal.

3. The method according to claim 1, further comprising:
   after one or more pulses of the second pulsed signal, comparing, by the comparator, the voltage value across the capacitive load with a second voltage threshold value; and
   in response to the voltage value being equal to or greater than the second voltage threshold value, stopping, by the control circuit, the second pulsed signal.

4. The method according to claim 1, further comprising:
   after one or more pulses of the first pulsed signal, and in response to the voltage value across the capacitive load being smaller than the first voltage threshold value, incrementing, using a counter of the circuit, a first count value; and
   in response to the first count value being equal to a first reference value, stopping, by the control circuit, the first pulsed signal.

5. The method according to claim 1, further comprising:
   after one or more pulses of the second pulsed signal, incrementing, using a counter of the circuit, a second count value; and
   in response to the second count value being equal to a second reference value, stopping, by the control circuit, the second pulsed signal.

6. The method according to claim 1, wherein applying, by the control circuit, each pulse of the first pulsed signal to the power transistor comprises:
   applying a first edge causing the power transistor to turn on;
   verifying, by a detection circuit, a first current level conducted by the power transistor; and
   in response to the first current level reaching a threshold level, applying a second edge causing the power transistor to turn off.

7. The method according to claim 6, wherein applying, by the control circuit, each pulse of the second pulsed signal to the power transistor comprises:
   applying a third edge causing the power transistor to turn on;
   verifying, by the detection circuit, a second current level conducted by the power transistor, and
   in response to the second current level reaching the threshold level, applying a fourth edge causing the power transistor to turn off.

8. The method according to claim 6, wherein the threshold level corresponds to a current level at which a thermal coefficient of the power transistor is negative.

9. The method according to claim 1, wherein applying, by the control circuit, each pulse of the first pulsed signal to the power transistor comprises:
   applying a first edge causing the power transistor to turn on;
   detecting, by a temperature sensor of the circuit, a temperature of the power transistor; and
   in response to the temperature of the power transistor reaching a threshold temperature, applying a second edge causing the power transistor to turn off.

10. The method according to claim 1, further comprising determining at least one value, among the first voltage threshold value, the value of the first wait time, or the value of the second wait time, using a stored value stored in a programmable memory of the circuit.

11. A circuit comprising:
    a power transistor configured to supply a capacitive load of the circuit;
    a control circuit configured to apply a first pulsed signal, comprising sequential first voltage pulses separated from each other by a first wait time, to a gate of the power transistor, and
    a comparator configured to compare, after one or more pulses of the first pulsed signal, a voltage value across the capacitive load with a first voltage threshold value;
    wherein the control circuit is further configured to, in response to the voltage value exceeding the first voltage threshold value, apply a second pulsed signal, comprising sequential second voltage pulses separated from each other by a second wait time, to the gate of the power transistor, wherein the second wait time is shorter than the first wait time.

12. The circuit according to claim 11, wherein:
    the comparator is further configured to, after one or more pulses of the second pulsed signal, perform a second comparison of the voltage value across the capacitive load with the first voltage threshold value; and
    the control circuit is further configured to, in response to the voltage value being smaller than or equal to the first voltage threshold value during the second comparison, stop the first pulsed signal.

13. The circuit according to claim 11, wherein:
the comparator is further configured to, after one or more pulses of the second pulsed signal, compare the voltage value across the capacitive load with a second voltage threshold value; and
the control circuit is further configured to, in response to the voltage value being equal to or greater than the second voltage threshold value, stop the second pulsed signal.

14. The circuit according to claim 11,
further comprising a counter configured to, after one or more pulses of the first pulsed signal, and in response to the voltage value across the capacitive load being smaller than the first voltage threshold value, increment a first count value;
wherein the control circuit is further configured to, in response to the first count value being equal to a first reference value, stop the first pulsed signal.

15. The circuit according to claim 11, wherein:
the circuit further comprises a counter configured to, after one or more pulses of the second pulsed signal, increment a second count value; and
the control circuit is further configured to, in response to the second count value being equal to a second reference value, stop the second pulsed signal.

16. The circuit according to claim 11, wherein:
the circuit further comprises a detection circuit configured to verify a first current level conducted by the power transistor; and
the control circuit configured to apply each pulse of the first pulsed signal to the power transistor comprises the control circuit configured to:
apply a first edge causing the power transistor to turn on; and
in response to the first current level reaching a threshold level, apply a second edge causing the power transistor to turn off.

17. The circuit according to claim 11, wherein:
the circuit further comprises a temperature sensor configured to detect a temperature of the power transistor; and
the control circuit configured to apply each pulse of the first pulsed signal to the power transistor comprises the control circuit configured to:
apply a first edge causing the power transistor to turn on; and
in response to the temperature of the power transistor reaching a threshold temperature, apply a second edge causing the power transistor to turn off.

18. The circuit according to claim 11, wherein:
the circuit further comprises a programmable memory; and
the control circuit is further configured to determine at least one value, among the first voltage threshold value, the value of the first wait time, or the value of the second wait time, using a stored value stored in the programmable memory.

19. A system comprising:
a transformer configured to supply a switch box; and
the switch box, comprising a circuit comprising:
a power transistor configured to supply a capacitive load of the circuit;
a control circuit configured to apply a first pulsed signal, comprising sequential first voltage pulses separated from each other by a first wait time, to a gate of the power transistor, and
a comparator configured to compare, after one or more pulses of the first pulsed signal, a voltage value across the capacitive load with a first voltage threshold value;
wherein the control circuit is further configured to, in response to the voltage value exceeding the first voltage threshold value, apply a second pulsed signal, comprising sequential second voltage pulses separated from each other by a second wait time, to the gate of the power transistor, wherein the second wait time is shorter than the first wait time.

20. The system according to claim 19, wherein the system is an automotive vehicle and the transformer and the switch box are components of the automotive vehicle.

* * * * *